United States Patent
Rager et al.

(10) Patent No.: US 11,863,635 B2
(45) Date of Patent: Jan. 2, 2024

(54) ENHANCED PROCESSING OF USER PROFILES USING DATA STRUCTURES SPECIALIZED FOR GRAPHICAL PROCESSING UNITS (GPUS)

(71) Applicant: Oracle International Corporation, Redwood Shores, CA (US)

(72) Inventors: David Lawrence Rager, Austin, TX (US); Andrew Edward Brownsword, Bowen Island (CA); Guy Lewis Steele, Jr., Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/830,591

(22) Filed: Jun. 2, 2022

(65) Prior Publication Data
US 2022/0303351 A1    Sep. 22, 2022

Related U.S. Application Data

(63) Continuation of application No. 17/085,819, filed on Oct. 30, 2020, now Pat. No. 11,375,040.
(Continued)

(51) Int. Cl.
*H04L 67/306*    (2022.01)
*G06T 1/20*    (2006.01)
(Continued)

(52) U.S. Cl.
CPC .......... *H04L 67/306* (2013.01); *G06F 9/3009* (2013.01); *G06F 9/4881* (2013.01);
(Continued)

(58) Field of Classification Search
CPC ............. H04L 67/306; G06F 16/24532; G06F 16/9027; G06F 16/2237; G06F 16/2246; G06F 16/258; G06F 9/4881; G06F 9/3009; G06F 9/52; G06T 1/20; G06Q 30/0201; G06Q 30/0269; G06Q 50/01
See application file for complete search history.

(56) References Cited

U.S. PATENT DOCUMENTS 6,453,347 B1    9/2002    Revashetti et al.
6,801,909 B2    10/2004    Delgado et al.
(Continued)

OTHER PUBLICATIONS

U.S. Appl. No. 17/085,819, Notice of Allowance dated Mar. 2, 2022, 11 pages.
(Continued)

*Primary Examiner* — Jungwon Chang
(74) *Attorney, Agent, or Firm* — Mughal Gaudry & Franklin PC

(57) ABSTRACT

Disclosed are techniques for processing user profiles using data structures that are specialized for processing by a GPU. More particularly, the disclosed techniques relate to systems and methods for evaluating characteristics of user profiles to determine whether to offload certain user profiles to the GPU for processing or to process the user profiles locally by one or more central processing units (CPUs). Processing user profiles may include comparing the interest tags included in the user profiles with logic trees, for example, logic trees representing marketing campaigns, to identify user profiles that match the campaigns.

18 Claims, 7 Drawing Sheets

Related U.S. Application Data

(60) Provisional application No. 62/929,662, filed on Nov. 1, 2019.

(51) Int. Cl.

| | | |
|---|---|---|
| *G06F 16/901* | (2019.01) | |
| *G06F 16/22* | (2019.01) | |
| *G06F 16/25* | (2019.01) | |
| *G06F 9/48* | (2006.01) | |
| *G06Q 30/0201* | (2023.01) | |
| *G06Q 30/0251* | (2023.01) | |
| *G06F 9/30* | (2018.01) | |
| *G06F 9/52* | (2006.01) | |
| *G06Q 50/00* | (2012.01) | |

(52) U.S. Cl.
CPC ............ *G06F 9/52* (2013.01); *G06F 16/2237* (2019.01); *G06F 16/2246* (2019.01); *G06F 16/258* (2019.01); *G06F 16/9027* (2019.01); *G06Q 30/0201* (2013.01); *G06Q 30/0269* (2013.01); *G06T 1/20* (2013.01); *G06Q 50/01* (2013.01)

(56) References Cited

U.S. PATENT DOCUMENTS

| | | | |
|---|---|---|---|
| 9,282,162 B2 | 3/2016 | Boyle et al. | |
| 9,298,777 B2 | 3/2016 | Lawrence | |
| 9,299,113 B2 | 3/2016 | Alonso et al. | |
| 10,116,680 B1 * | 10/2018 | Han | G06F 21/552 |
| 10,311,480 B2 | 6/2019 | Singh et al. | |
| 10,657,559 B2 | 5/2020 | Sinha et al. | |
| 10,742,716 B1 | 8/2020 | Finkelstein et al. | |
| 10,950,135 B2 | 3/2021 | Ghatage et al. | |
| 11,375,040 B2 | 6/2022 | Rager et al. | |
| 11,475,338 B2 | 10/2022 | Zheng | |
| 11,599,946 B2 | 3/2023 | Yeh | |
| 2003/0074400 A1 | 4/2003 | Brooks et al. | |
| 2004/0128617 A1 | 7/2004 | Oh | |
| 2008/0162537 A1 | 7/2008 | Mancini | |
| 2009/0265220 A1 | 10/2009 | Bayraktar et al. | |
| 2012/0226560 A1 | 9/2012 | Chang et al. | |
| 2014/0122245 A1 * | 5/2014 | Qu | G06Q 30/0269 705/14.66 |
| 2015/0106209 A1 | 4/2015 | Levi et al. | |
| 2015/0213074 A1 * | 7/2015 | Varakin | G06F 16/24532 707/754 |
| 2016/0253710 A1 | 9/2016 | Publicover et al. | |
| 2017/0228784 A1 | 8/2017 | Singh et al. | |
| 2018/0130091 A1 | 5/2018 | Rae | |
| 2018/0217836 A1 * | 8/2018 | Johnson | G06F 9/28 |
| 2018/0240042 A1 * | 8/2018 | Boada | G06Q 50/01 |

OTHER PUBLICATIONS

U.S. Appl. No. 17/085,811, Notice of Allowance dated Jan. 12, 2023, 12 pages.

Liu et al., "Multi-Interest Network with Dynamic Routing for Recommendation at Tmall"; https://doi.org/10.1145/3357384; 2019 Association for Computing Machinery; (Liu_2019.pdf; pp. 2615-2623) (Year: 2019).

Notice of Allowance for U.S. Appl. No. 17/085,842, dated Aug. 4, 2023.

* cited by examiner

100

ENHANCED PROCESSING OF USER PROFILES USING DATA STRUCTURES SPECIALIZED FOR GRAPHICAL PROCESSING UNITS (GPUS)

CROSS-REFERENCE TO RELATED APPLICATIONS

This application is a continuation of U.S. patent application Ser. No. 17/085,819, filed Oct. 30, 2020, which claims the priority benefit of U.S. Provisional Patent Application No. 62/929,662, filed on Nov. 1, 2019, the entire disclosures of which are incorporated by reference, for all purposes, as if fully set forth herein.

TECHNICAL FIELD

The present disclosure generally relates to techniques for processing computational tasks involving user profiles using specialized data structures configured to be processed by a Graphical Processing Unit (GPU). More particularly, the present disclosure relates to techniques for identifying certain user profiles to offload to the GPU for parallel processing. The present disclosure also relates to GPU-specialized techniques for using attributes of user profiles (e.g., interest tags) to evaluate campaign logic trees to determine which user profiles match the campaign logic trees. Additionally, the present disclosure relates to GPU-specialized techniques for tracking which attributes of user profiles are responsible for causing a campaign logic tree to evaluate as "true."

BACKGROUND

Cloud-based applications can perform certain functions on a plurality of user profiles stored in cloud-based networks. For example, cloud-based applications can enable users to generate queries for user profiles that include certain user attributes, such as a particular interest or user location. The cloud-based applications often rely on central processing units (CPUs) of cloud-based servers to execute the functions. As the scale and complexity of user profiles increases to big-data levels, however, the cloud-based applications may manage millions of user profiles. Further, each user profile may include tens of thousands of distinct user interests. Thus, performing functions using the CPUs of cloud-based servers has become computationally burdensome and technically challenging.

SUMMARY

Certain aspects and features of the present disclosure relate to techniques for efficiently performing computational tasks using GPUs in a cloud-based network environment. Cloud-based applications can perform certain functionality using data sets of user profiles. For example, functionality can include evaluating attributes (e.g., interest tags) of user profiles to determine which user profiles satisfy the logic of a marketing campaign. Performing the functionality can involve executing code using CPUs local to cloud-based servers that support the cloud-based application. However, the computational efficiency of performing tasks using cloud-based applications can be improved by evaluating sets of user profiles in a parallel manner, such as by a GPU. GPUs are configured to perform parallel operations, and thus, GPUs increase the computational efficiency of performing certain functionality or tasks, such as determining which user profiles satisfy the logic of a marketing campaign.

Certain aspects and features of the present disclosure relate to techniques for identifying a set of user profiles to offload from a CPU of a cloud-based server to a GPU for processing in a parallel manner. In some implementations, a cloud-based application may be configured to perform the functionality of evaluating attributes of a set of user profiles against the logic of a marketing campaign to identify which user profiles match (e.g., satisfy as "true") the logic of the marketing campaign. A user profile may include one or more user attributes that characterize an individual user. For example, a user attribute can be any metadata detected from or in association with an interaction between the user and a webpage, mobile webpage, or native application. Further, a user attribute can be represented by an interest tag, which is a value that represents an interest of the user associated with the user profile. An interest tag may be stored in a user profile in response to a website or native application detecting an interaction by the user during a browsing session. To illustrate and only as a non-limiting example, if a user operates a user device to load a website relating to coffee, the website may generate a notification to the cloud-based application indicating that the user is interested in coffee. As a result, the cloud-based application may generate an interest tag representing an interest in coffee and store that interest tag in the user's user profile.

Additionally, a marketing campaign may be represented by a campaign logic tree that includes one or more nodes in a hierarchical tree structure. Each node may represent an operand value or an operator. For example, the marketing campaign may be represented by a campaign logic tree, as follows: "users who are interested in (coffee AND creamer)". In this example, "coffee" and "creamer" are each operand values and "AND" is the operator. A user profile matches or satisfies this campaign logic tree as "true" when the user profile includes an interest tag for "coffee" and a separate interest tag for "creamer." Conversely, a user profile that does not include an interest tag for "creamer" does not satisfy this campaign logic tree because the user profile does not satisfy the campaign logic tree as "true" (e.g., a result of evaluating the campaign logic tree using the user profile including only either "coffee" or "creamer" interest tags would not be "true," but rather would be "false").

I. Determining when to Offload Processing Tasks to GPU

A cloud-based application may use CPUs local to cloud-based servers to perform the task of evaluating the interest tags of user profiles to determine whether the interest tags satisfy any campaign logic trees. In some implementations, the cloud-based application may evaluate one or more characteristics of a user profile to determine whether that user profile can be offloaded to a GPU for evaluating with other user profiles in parallel, instead of being processed by the local CPU. To illustrate and only as a non-limiting example, the cloud-based application may evaluate the number of interest tags included in the user profile. If the number of interest tags is above a threshold (e.g., 66 or more interest tags), then the cloud-based application may offload that user profile to be processed by the GPU instead of the CPU. Alternatively, if the number of interest tags is equal to or below the threshold, then the cloud-based application may evaluate the user profiles against campaign logic trees locally using the CPU of the cloud-based server. It will be appreciated that any characteristic of the user profile may be evaluated for determining whether to offload the user profile to the GPU, and thus, the present disclosure is not limited to the number of interest tags in the example above.

A GPU is configured with a set of threads. Each thread of the set of threads may refer to a scheduled chain of instructions running on a GPU core. The GPU core can independently run as many as 32 threads at the same time. A warp is a group of 32 threads that each execute in a lock-step manner on the same GPU core. GPUs are thus configured for parallel processing. Further, random memory accesses are computationally expensive for GPUs, and thus, storing the user profiles and the campaign logic trees in specialized data structures enables the user profiles and the campaign logic trees to be efficiently consumed by the GPU for processing. A set of user profiles (e.g., a batch of 256 user profiles) may be split into subsets of user profiles. Each subset of user profiles may match the warp size (e.g., 32 user profiles, with one user profile per GPU thread). Each thread within a warp may process data relating to a single user. For example, thread #1 of the warp may perform read and write requests relating to interest tags included in user profile #1, thread #2 of the warp may perform read and write requests relating to interest tags included in user profile #2, thread #3 of the warp may perform read and write requests relating to interest tags included in user profile #3, and so on.

II. Generating a GPU-Specialized Data Structure to Store User Tags in a Manner that is Consumable by the GPU The cloud-based application can perform pre-processing on the user profiles to transform the user profiles into specialized data structures that are consumable by the GPU. For example, the interest tags of a user profile can be transformed into a data structure that is specialized for consumption by the GPU. The pre-processing can include organizing the interest tags included in each user profile in an interleaved manner to facilitate the coalescing of read and write requests from the GPU processing cores. As an illustrative example, pre-processing the user profiles can include creating an array of interest tags that are stored in a sorted order, such as a user interest array including [interest_id_1 interest_id_2 interest_id_3 . . . interest_id_n]. Additionally, pre-processing the user profiles can include creating another array of interleaved user profile information, such as an array including [interest_id_1_applies_to_user_1 interest_id_1_applies_to_user_2 . . . interest_id_1_applies_to_user_32 interest_id_2_applies_to_user_1 interest_id_2_applies_to_user_2 . . . interest_id_2_applies_to_user_32 . . . ]. In some examples, user profiles can include additional data fields (other than interest tags), such as tag occurrence count (e.g., a number of times the interest tag was created) and tag recency (e.g., a number of days ago that the interest tag was created). Further, if a user profile includes the same interest tag more than once (e.g., two different websites notify the cloud-based application that a user likes chocolate), then multiple slots of the user interest array may be dedicated to that interest tag. Any additional data fields may also be included in an array in an interleaved manner.

Organizing the specialized data structure storing interest tags of user profiles enables each GPU thread in the warp to iterate in lock-step through the interest tags stored in the user interest array (e.g., a first interest tag stored in the array through the last interest tag stored in the array). For each interest tag stored in the array, the GPU thread may determine whether the user profile (that corresponds to the GPU thread) includes that interest tag. If the user profile includes that interest tag, then the GPU thread may set a bit corresponding to that particular interest tag's slot in an array corresponding to the user profile (e.g., the user interests array) as true. Each GPU thread may access memory adjacent to the memory associated with the other user profiles, and as such, the read requests from the GPU are coalesced (e.g., if the GPU reads in one user's interest tag bit, the GPU will likely already be loading the other interest tags of the other user profiles in that GPU warp for that particular interest tag).

III. Generating a GPU-Specialized Data Structure to Store the Operands and Operators of Campaign Logic Trees in a Manner that is Consumable by the GPU In certain embodiments, the cloud-based application can perform pre-processing on the campaign logic trees to organize the operand values and operators of the campaign logic trees into a data structure that is specialized for consumption by the GPU. For example, positions 1 to 5 of the first array may correspond to the operands of a first campaign logic tree, positions 6 through 13 may correspond to the operands of a second campaign logic tree, and so on. The specialized data structure storing the campaign logic trees may include three arrays. The first array may store each operand's interest tag identifier (ID) (e.g., the first array being used for debugging). The second array may store the operators for each campaign logic tree. Additionally, a third array may be defined to store data representing whether the next data element to be read during evaluation of the first array and the second array (e.g., during evaluation of the campaign logic tree) is an operand or operator. The first array, second array, and the third array may be read-only data structures that contain operands (e.g., integers) in the case of the first array, operators (e.g., unsigned chars) in the case of the second array, and a bit array of Boolean bits indicating whether the next data element to be read during evaluation is an operand or operator in the case of the third array. In some examples, after creating a campaign data structure, this campaign data structure may be treated as read-only as the cloud-based application proceeds to evaluate thousands of user profiles.

In certain embodiments, when the GPU retrieves user #1's operand value, the GPU threads of a warp each transmit read requests, which are coalesced, such that when the GPU threads of the warp retrieve user #1's operand value, the GPU threads also retrieve user #2's through user #32's operand values in a single interaction. In some implementations, the values of each user's campaign logic tree may be interleaved by user. As an illustrative non-limiting example, the specialized data structure storing the operand values of the campaign logic trees may include an array of values represented by [operand_1_value_user_1 operand_1_value_user_2 . . . operand_1_value_user_32 operand_2_user_1 operand_2_value_user_2 . . . operand_2_value_user_32 . . . ]. As another illustrative non-limiting example, the specialized data structure storing the operators of the campaign logic trees may include an array of values represented by [operator_1_value_user_1 operator_1_value_user_2 . . . operator_1_value_user_32 operator_2_value_user_1 operator_2_value_user_2 . . . operator_2_value_user_32 . . . ].

After the campaign logic trees are stored in the specialized data structures, when the GPU threads of a warp evaluates the logic trees, the read request for each of the GPU threads in the warp can be read together in a single interaction. For example, when the GPU thread for user #1 reads user #1's operand_value_1, the GPU thread for user #2 may automatically load user #2's operand_value_1, and so on through user #32's operand_value_1. The read requests transmitted from the GPU threads of the warp are coalesced (e.g., grouped together) because the threads of a warp share a cache line. Additionally, when the GPU thread of a warp reads operand_value_1, which could be as small as a bit, the GPU thread may also read the set of operand_value_2_user_*, operand_value_3_user_*, operand_value_4_user_*; and so forth due to loading of the whole cache line.

IV. The GPU Evaluates User Profiles Against Campaign Logic Trees to Identify Campaigns that are Possible Matches In certain embodiments, the GPU thread of a warp may process a user profile by evaluating each campaign logic tree against the user interest tags included in the user profile. For example, the GPU thread may access an operator array and the operand value array for each campaign listed as a "possible match" in an array described above. The operator array may include the operators from each campaign logic tree. The operand value array may include the operand values from each campaign logic tree. The operator array and the operand value array are data structures specialized for processing by the GPU. The operator array and the operand value array are configured to enable each GPU thread of the warp to read in lock-step either operator values (in the case of reading from the operator array) or operand values (in the case of reading from the operand value array) in a single transaction. The GPU then uses the user interest tags included in a user profile to evaluate the operator array and the operand value array to determine whether the campaign logic tree is a true match. The user interest tags may no longer exist at this point. Rather, a GPU thread may access the boolean values of the user interest tags in the operand_value array.

In certain embodiments, when the cloud-based application evaluates one or more characteristics of a user profile and determines to offload the user profile to the GPU for processing, the GPU threads of a warp may each initiate a matching protocol to identify campaign logic trees that match (or are satisfied by) the user profile. For example, executing the matching protocol may include transmitting read requests to each of the pre-processed GPU-specialized data structures storing the user profiles and the pre-processed GPU-specialized data structures storing the campaign logic trees. In some cases, a GPU thread of a warp may initialize an operand_values array associated with a particular user profile to contain only false (0) values. The GPU thread may then write to the operand_values array (e.g., fill in the operand_values for the user associated with the GPU thread). For example, the GPU thread may fill in the operands_value array by performing a lookup of an interest map array to identify the operand offset(s) associated with a given interest tag included in the user profile. An offset value may represent a campaign logic tree that includes the interest tag as an operand. For each operand offset of a given interest tag included in the user profile, the GPU thread may set the associated value in the operand_value to "true" (e.g., to "1").

As another illustrative example, a GPU thread may read an interest tag included in a user profile. The GPU thread may then perform a lookup of the interest map array and set. The interest map array may include "coffee" as an interest tag. For each campaign logic tree that references "coffee," the interest map array may include an offset value that corresponds to the campaign logic tree. In this example, the interest map array may include an entry including "coffee" and operand offsets 33, 2000, and 3800, to refer to the operands in the three campaign logic trees that reference "coffee." The GPU may then set the bits at offsets 33, 2000, and 3800, representing "coffee" included in the operand_value array of the user profile to "true."

In other implementations, the GPU thread may read an interest tag of "coffee," and then the GPU thread may perform a lookup of a campaign logic tree that includes, for example, the logic of "coffee AND tea." The GPU thread may determine that the campaign logic tree may be marked in a separate array as a "possible match" because the interest tag of "coffee" included in the user profile matches the operand value of "coffee" in the campaign logic tree. At this stage, the GPU thread may not be evaluating the entire campaign logic tree to determine whether the user profile satisfies the entire logic tree, but rather, may be determining whether or not the campaign logic tree is a possible match. A campaign logic tree is a possible match when the campaign logic tree includes an operand value that is also an interest tag of a user profile.

In certain embodiments, when a GPU tread retrieves an interest tag from the user interest array, the GPU thread then performs the computation task of determining whether the retrieved interest tag is included in the user profile that corresponds to the GPU thread. If the retrieved interest tag is included in the user profile corresponding to the GPU thread, then the GPU thread may write a value of "true" to an array indicating that the user profile includes the retrieved interest tag. Further, when one interest tag is retrieved, the remaining threads of the warp (e.g., the GPU threads corresponding to remaining user #2 through user #32) may also be determining whether the retrieved interest tag is included in the user profiles of user #2 through user profile #32.

In certain embodiments, the retrieved interest tag may be associated with other interest tags. For example, the GPU thread may retrieve interest tag 4123456. Further, the GPU thread may perform a lookup of a map linking interest tags to other interest tags. As an illustrative example, interest tag #123456 may be associated with operand_value_offset_5, operand_value_offset_450, and operand_value_offset_98765. The GPU thread may perform a lookup that identifies other associated interest tags. The lookup performed by the GPU may be a random memory access. Random memory accesses may be computationally expensive. Since the 32 user profiles (e.g., the other GPU threads of a warp) would be performing the lookup of an interest tag on interest tag 123456 at the same time; the GPU threads only have to perform that lookup once.

V. Flagging Campaign Logic Trees as "Possible Matches"

In certain embodiments, the GPU thread that corresponds to a user profile may re-use the lookup that was previously performed (and described above with respect to the interest map array) for each interest tag included in the user profile. The GPU thread may re-use the values received from performing the lookup to determine the operand offset values for that interest tag. Then, the GPU thread may perform a lookup of a campaign index for each operand offset value in another map (e.g., an array of integers). The GPU thread may then use the campaign_index as the offset into a campaign relevance array that indicates, for each interest tag included in the user profile, which campaign logic trees include that interest tag as an operand value. The GPU may then set the value in that campaign relevance array to "true" (e.g., "1") to flag the campaign logic tree that is associated with the offset value included in the operand_offset array.

As an illustrative example, each thread of a warp of a GPU can retrieve an interest tag from the user interest array. For every interest tag retrieved, the thread can identify the operand values of various campaign logic trees that match the interest tag (e.g., using an interest map array, which maps interest tags to offset operand values of campaign logic trees). For each operand that matches the interest tag, the thread can mark that operand as true by setting a bit in another array to "1" for example. Additionally, the thread can mark the campaign logic tree that references that operand as a "possible match" by setting a bit to "1" in yet another array. For every campaign logic tree marked as a "possible match," the thread can evaluate the logic of the campaign logic tree to determine if the logic has been satisfied as "true." If the logic has been satisfied as "true," then the thread sets another bit in another array to indicate that the campaign logic tree has been satisfied.

In certain embodiments, for each interest tag, after a GPU thread has determined a list of the campaign logic trees that include the interest tag, the GPU may track the list of campaign logic trees by setting a value in an array associated with the user profile for that GPU thread. The value that is set by the GPU may be set for each campaign logic tree that includes an interest tag that is also included in the user profile. The set value in the array may represent an indication that the campaign logic tree that corresponds to the set value includes a given interest tag. As an illustrative example, the GPU thread may set values in an array, as follows: [1 0 1 1 0 0 0], which represents an ordered set of seven campaign logic trees. The first campaign logic tree in the ordered set corresponds to a value of "1," indicating that the first campaign logic tree references an interest of the user. The second campaign logic tree in the ordered set corresponds to a value of "0," and thus, the second campaign logic tree does not reference any of the user's interests. The third campaign logic tree in the ordered set corresponds to a value of "1," and thus, the third campaign logic tree does reference at least one of the user's interests. The fourth campaign logic tree in the ordered set corresponds to a value of "1," and thus, the fourth campaign logic tree references the user's interest, and so on, for the fifth, sixth, and seventh campaign logic trees.

VI. Evaluating Campaigns and Marking the Campaigns as a Match

In certain embodiments, to determine whether a campaign logic tree is satisfied by a user profile, each GPU thread of a warp iteratively evaluates each operator based on the operand values that precede the operator. In some implementations, the operand values and operators may be stored in reverse-polish notation, thereby simplifying the evaluation of the campaign logic tree. Further, in some implementations, each GPU thread of a warp checks a bit array representing whether the campaign logic tree is a possible match to ensure that the GPU thread is only evaluating campaign logic trees for which a value indicating "true" was set. In some implementations, the GPU threads of a warp evaluate operand values of the operand value array and operators of the operator array in lock-step. That is, if GPU thread #3 is reading operand_value_789, then, the other GPU threads of the warp (e.g., threads #1, #2, and #4 through #32) may also be reading their respective operand_value_789 because the specialized data structures enable the GPU threads of a warp to coalesce read and write requests.

After each campaign logic tree is evaluated using the appropriate bits from the operand_values array, the GPU thread may determine whether any one of the operators were satisfied as "true." For example, if the interest tag of a user profile is "coffee" and the campaign logic tree is "coffee OR tea," then the user profile satisfies the campaign logic tree. Accordingly, the GPU thread may set a value in an array indicating that the campaign logic tree is a "match" for the user profile. If, however, the campaign logic tree was "coffee AND tea," then the user profile would not satisfy the campaign logic tree because the "AND" operator would not be evaluated as true. The GPU thread may then set a value in an array indicating that the campaign logic tree was not a "match" for the user profile.

VII. Tracking the Evaluation to Determine "Responsible Tags" During Campaign Evaluation In certain embodiments, for each campaign logic tree that is listed as a match, the GPU may track the evaluation to determine which operand values caused (e.g., were relevant to) determining the match. Continuing with the illustrative example above, in which the campaign logic tree is "coffee OR tea" and the user profile includes an interest tag representing "coffee," the GPU thread may determine that the operator (e.g., "OR") of the campaign logic tree has been satisfied, and thus, the campaign logic tree is determined to match the user profile. The GPU thread may also monitor which interest tag caused the user profile to satisfy the campaign logic tree. For example, after the GPU thread evaluates a campaign logic tree by iteratively processing the operand values and operators of the campaign logic tree, the GPU also tracks whether the branch of the campaign logic tree is relevant or not. Additionally, if a campaign logic tree evaluates to "false" (e.g., no parent or root operators in the entire logic tree were satisfied as "true"), then none of the branches of the campaign logic tree would be relevant because no user interest caused the logic tree to be satisfied as "true." As another non-limiting example, a branch four levels deep within a campaign logic tree may appear to be relevant (e.g., may appear to cause the logic tree to be satisfied as true), but may ultimately be determined as not being irrelevant because a parent operator one or more levels higher may be evaluated to false.

As another illustrative example, a campaign logic tree includes (OR cars (AND drinks food)) and a user profile includes the interest tag of "likes cars" and another interest tag of "likes drinks, but not food." The GPU thread may track the evaluation for "responsible tags" by identifying that only the "cars" branch is responsible for satisfying the logic as "true." If the interest tag is responsible for satisfying the logic as "true," the thread can mark the interest tag as a "responsible tag" by setting a bit in yet another array and store the integer representing that interest (e.g., the integer representing "cars" in the example above) in an array of "responsible interests" for that campaign logic tree.

As yet another illustrative example, before compiling the interest tags responsible for or contributing to satisfying each campaign logic tree as "true," the GPU thread may first determine which interest tags contributed to the campaign logic tree being evaluated as "true." A responsible tag as used herein may refer to an interest tag that contributed to a campaign logic tree being evaluated as "true." For example, if a campaign logic tree includes "coffee OR tea," and a user profile only includes an interest tag representing "tea," then the GPU thread would return the interest tag of "tea" as a "responsible tag" that contributed to satisfying the campaign logic tree or contributed to the evaluation of the logic tree as "true."

VIII. Storing the "Responsible Tags" in the GPU-Optimized Data Structure

In certain embodiments, the matching protocol may allocate one or more tiers of storage space on the GPU for storing "responsible tags." The one or more tiers of the storage space may be specialized for storing data processed by the GPU (e.g., the data stored being the "responsible tags"). While the matching protocol may allocate any number of storage spaces, in some implementations, the matching protocol allocates three storage spaces: a primary storage space, a secondary storage space, and a ternary storage space. When the GPU identifies an interest tag that contributed to a match, the GPU attempts to first store that "responsible tag" in the primary storage space. If the primary storage space is full, then the GPU attempts to store the "responsible tag" in the secondary storage space, and so on. Each storage space may be progressively shared by more GPU threads and may use one or more atomic operations, which can affect a larger number of other GPU threads. In some implementations, the primary storage space may be unique to each GPU block and thread combination. Values can be saved in the primary storage space without use of an atomic operation. The secondary space may include slots that are unique to each GPU block, but that are shared across all GPU threads. Values can be saved in the secondary storage space using an atomic operation to allocate a slot to a thread. The ternary storage space may include one or more slots that are shared across the GPU blocks and threads. Values can be saved in the ternary storage space using an atomic operation to allocate a slot to a block and thread. The resulting data structure is a linked list for each user's campaign logic tree match.

IX. Generating a CPU-Readable Data Structure that can Store the "Responsible Tags" in a CPU-Readable Manner In certain embodiments, for each campaign logic tree associated with a linked list of "responsible tags" in the one or more tiers of the GPU-specialized storage spaces, the "responsible tags" may be copied to a new data structure that can be read by a CPU. The CPU may not be configured to efficiently read data from the one or more tiers of the GPU-specialized storage spaces described above, and thus, a new data structure may be generated to store the "responsible tags" from the GPU-specialized storage spaces in a manner that is readable by a CPU. The new data structure may be configured into multiple segments that each store 128 "responsible tags." Each segment can store the "responsible tags" for multiple campaigns, unless the segment would "overflow," in which case the "responsible tags" for the campaign causing the overflow would be stored in the next segment. The "responsible tags" may be stored in the new data structure in a dense format that permits a wide variety in the number of "responsible tags" that can be stored in a segment per campaign match. A given segment can store up to a maximum number of "responsible tags" (e.g., a maximum number of 128). If, for example, only a few "responsible tags" contributed to a campaign logic tree evaluating as "true," then the segment available slots of the new data structure can be filled by the "responsible tags" of the next campaign logic tree, provided by that the segment does not "overflow" by storing the "responsible tags" of the next campaign logic tree. An overflow may be caused if the number of "responsible tags" of the next campaign logic tree plus the "responsible tags" already stored in a segment would exceed the maximum number of "responsible tags" that can be stored in the segment. If a potential overflow of a segment is detected, then the "responsible tags" of the next campaign logic tree can be stored in the next available segment.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
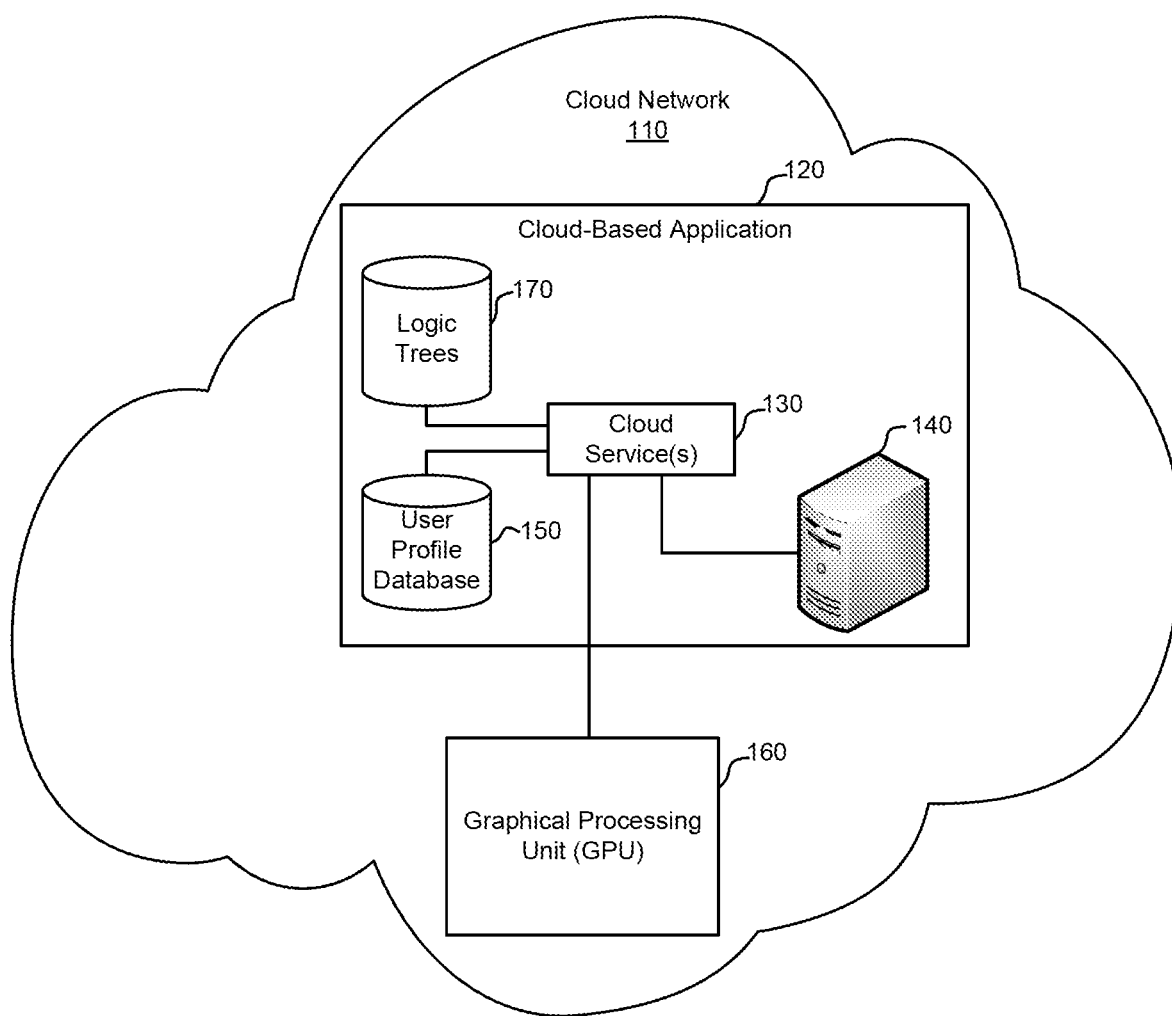
FIG. 1 is a block diagram illustrating an example of a network environment, in which a cloud-based application evaluates one or more characteristics of a user profile to determine whether or not to offload the user profile to a GPU for processing, according to some aspects of the present disclosure.

FIG. 1 is a block diagram illustrating an example of a network environment, in which a cloud-based application evaluates one or more characteristics of a user profile to determine whether or not to offload the user profile to a GPU for processing, according to some aspects. Network environment 100 may include cloud network 110. Could network 110 may be a cloud-based network that includes any number of cloud services, such as cloud service 130 (e.g., Oracle Data Cloud). Cloud service 130 may be a cloud-based application that enables users to perform functionality, for example, on user profiles stored in user profile database 150. As a non-limiting example, cloud services 130 may include business intelligence analytics, user profile querying, web analytics, and other suitable web analytics functionality.

Cloud service 130 may be configured to execute one or more functions using cloud-based server 140. Cloud-based server 140 may be a server that includes one or more local CPUs supporting the functionality of cloud service 130. In some implementations, cloud server 130 may be configured to offload the processing of certain computation tasks to GPU 160 for efficient parallel processing, instead of processing the computational task using cloud-based server 140. For example, cloud service 130 may be configured to provide the functionality of evaluating campaign logic trees to determine which user profiles satisfy the campaign logic trees. In this example, cloud-based server 140 may be configured to use the local CPU to execute the functionality of comparing user profiles to campaign logic trees.

In some implementations, cloud-based service 130 may evaluate one or more characteristics of a user profile stored in user profile database 150 to determine whether or not to offload the processing of the user profile to GPU 160. Non-limiting examples of the characteristics may include a number of interest tags included in the user profile, a user location indicated by information included in the user profile, or any suitable information included in the user profile or associated with the user profile. If the user profile satisfies an offloading condition (e.g., the number of interest tags included in the use profile exceeds a threshold number, such as 66), then the cloud service may offload the computational tasks involved with processing the user profile to GPU 160. The GPU 160 may perform a matching protocol as described herein (e.g., in the "Summary" above) and other steps also described above to process the user profile. Further, the cloud service 130 may pre-process the user profiles and the campaign logic trees database 170 also stored within cloud network 110 so as to store the user profiles and campaign logic trees in data structures specialized for GPU processing. If the user profile does not satisfy the offloading condition, then the cloud-based server 140 may perform one or more computational tasks involved with processing the user profile.

Figure 2:
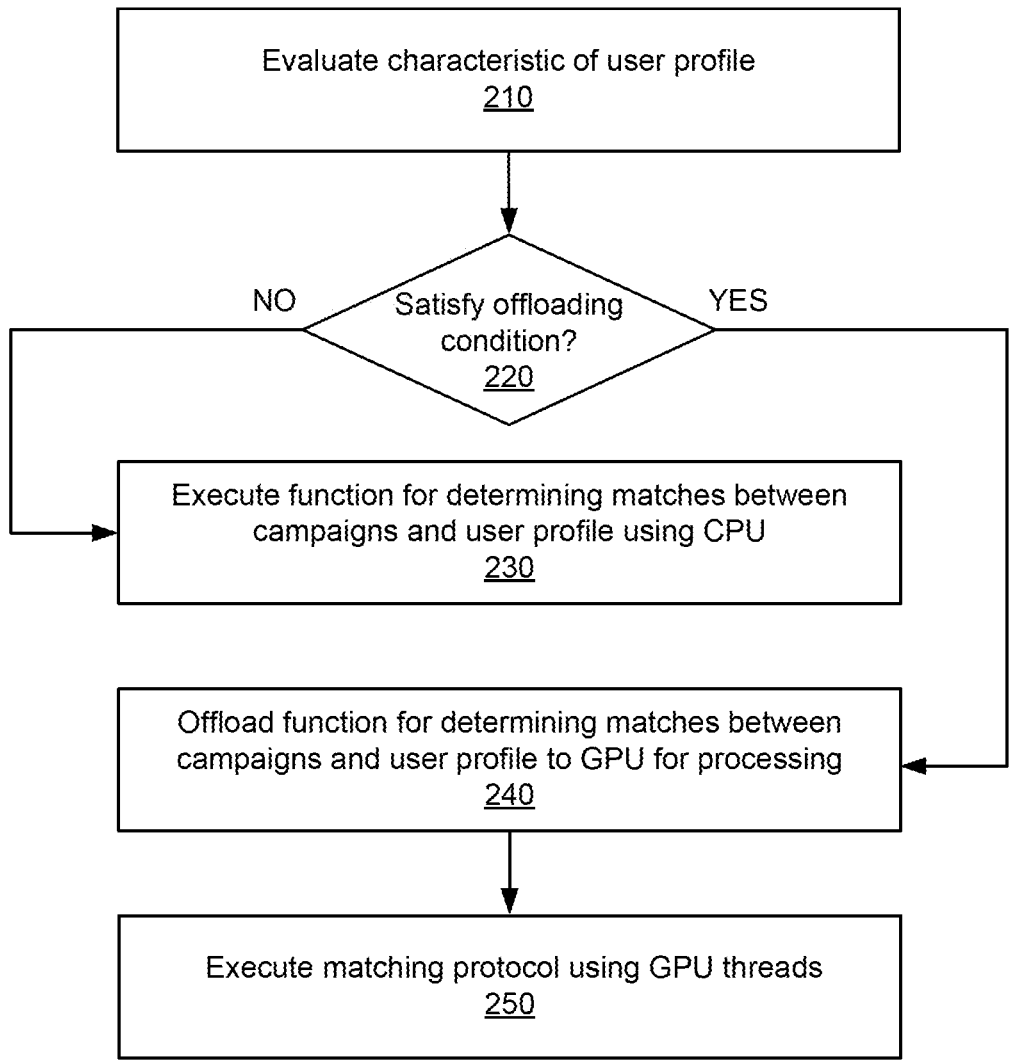
FIG. 2 is a flowchart illustrating an example of a process for offloading user profiles to a GPU for processing, according to some aspects.

FIG. 2 is a flowchart illustrating an example process. Process 200 may be performed, for example, by any of the components described herein, for example, cloud-based application 120, cloud service 130, cloud-based server 140, and/or GPU 160. Further, process 200 may be performed to enhance the computational efficiency of performing functionality supported by the cloud-based application 120.

Process 200 begins at block 210 where the cloud-based application 120 or the cloud service 130 evaluates one or more characteristics of a user profile to determine whether or not to offload the processing tasks associated with that user profile to a GPU. Non-limiting examples of the characteristics may include a number of interest tags included in the user profile, a user location indicated by information included in the user profile, or any suitable information included in the user profile or associated with the user profile.

At block 220, the cloud-based application 120, for example, may determine whether or not an offloading condition has been satisfied. The offloading condition may be a threshold associated with a characteristic of the user profile. For example, the offloading condition may be a threshold number of interest tags included in the user profile. If the threshold number of interest tags is exceeded, for example, then at block 240, the cloud-based application may offload processing of the user profile to the GPU. If the offloading condition is not satisfied, then at block 230, the cloud-based application 120 may execute the function for determining matches between campaigns and the user profile using the local CPUs of the cloud-based server 140. At block 240, when the cloud-based application has determined to offload the processing of the user profile to the GPU, the GPU may perform a matching protocol (and other related tasks) to process the user profile.

Figure 3:
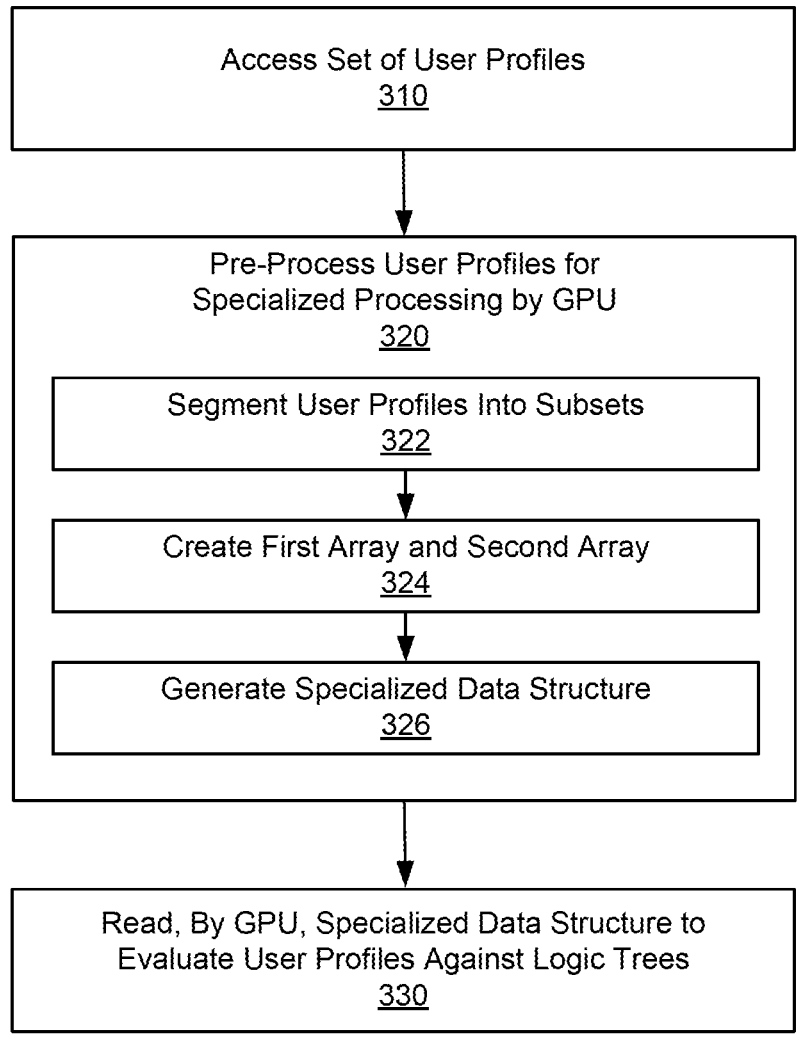
FIG. 3 is a flowchart illustrating an example of a process for evaluating a set of user profiles against campaign logic trees, according to some aspects of the present disclosure.

FIG. 3 is a flowchart illustrating an example of a process for evaluating a set of user profiles against campaign logic trees, according to some aspects of the present disclosure. Process 300 may be performed, for example, by any of the components described herein, for example, cloud-based application 120, cloud service 130, cloud-based server 140, and/or GPU 160. Further, process 300 may be performed to evaluate interest tags of user profiles against a campaign logic tree to identify which user profiles satisfy the logic of the campaign logic tree in a computationally efficient manner.

Process 300 begins at block 310 where cloud-based application 120 accesses or retrieves a set of user profiles. Each user profile can include any number of interest tags. The interest tags included in a user profile are determined based on interactions between the user and a website or a native application.

At block 320, cloud-based application 120 can pre-process the user profiles for consuming by a GPU. Pre-processing the user profiles may include generating a specialized data structure for storing the interest tags of the set of user profiles. The specialized data structure can be configured so that the threads of a warp of the GPU can access memory adjacent to the one user profile's interest tag. Thus, the pre-processing can include organizing the interest tags included in each user profile in an interleaved manner to facilitate the coalescing of read and write requests from the GPU processing cores.

Within block 320, cloud-based application 120 may also perform blocks 322, 324, and 326. At block 322, cloud-based application 120 can segment the set of user profiles into one or more subsets of user profiles. For example, the set of user profiles (e.g., a batch of 256 user profiles) are split up into subsets, such that each subset is of a size that matches the warp size (e.g., 32 user profiles in a subset of user profiles). At block 324, cloud-based application 120 can create at least two arrays for storing interest tags of user profiles in an arrangement that is consumable by a warp of the GPU. In some implementations, pre-processing the user profiles can include creating a first array, which is an array of all unique interest tags associated with the set of user profiles. The unique interest tags can be stored in a sorted order. For example, if there are N unique interest tags across the set of user profiles, then the first array includes [interest_id_1 interest_id_2 interest_id_3 . . . interest_id_N]. Additionally, pre-processing the user profiles can include creating a second array of interest tags that are interleaved over the set of user profiles. For example, if there are 32 user profiles in a subset of user profiles, then the second array may be a 2D array that includes

```
[interest_id_1_applies_to_consumer_1    interest_id_1_applies_to_consumer_2 ...
interest_id_1_applies_to_consumer_32
interest_id_2_applies_to_consumer_1    interest_id_2_applies_to_consumer_2 ...
interest_id_2_applies_to_consumer_32
. . .
interest_id_N_applies_to_consumer_1    interest_id_N_applies_to_consumer_2 ...
interest_id_N_applies_to_consumer_32].
```

Organizing the specialized data structure storing interest tags of user profiles enables each GPU thread in the warp to iterate in lock-step through the interest tags stored in the user interest array (e.g., a first interest tag stored in the array through the last interest tag stored in the array). For each interest tag stored in the array, the GPU thread may determine whether the user profile (that corresponds to the GPU thread) includes that interest tag. If the user profile includes that interest tag, then the GPU thread may set a bit corresponding to that particular interest tag's slot in an array corresponding to the user profile (e.g., the user interests array) as true. Each GPU thread may access memory adjacent to the memory associated with the other user profiles, and as such, the read requests from the GPU are coalesced (e.g., if the GPU reads in one user's interest tag bit, the GPU will likely already be loading the other interest tags of the other user profiles in that GPU warp for that particular interest tag). At block 326, cloud-based application 120 can generate the specialized data structure using the first array and the second array. The specialized data structure can then store the various interest tags of the set of user profiles.

At block 330, the warp of the GPU can read from the specialized data structure to evaluate whether the interest tags of user profiles satisfy the logic of campaign logic trees. In some implementations, the evaluation at block 330 may be performed using a matching protocol, which can be executed by warp of the GPU. The matching protocol is described in greater detail with respect to FIG. 4.

Figure 4:
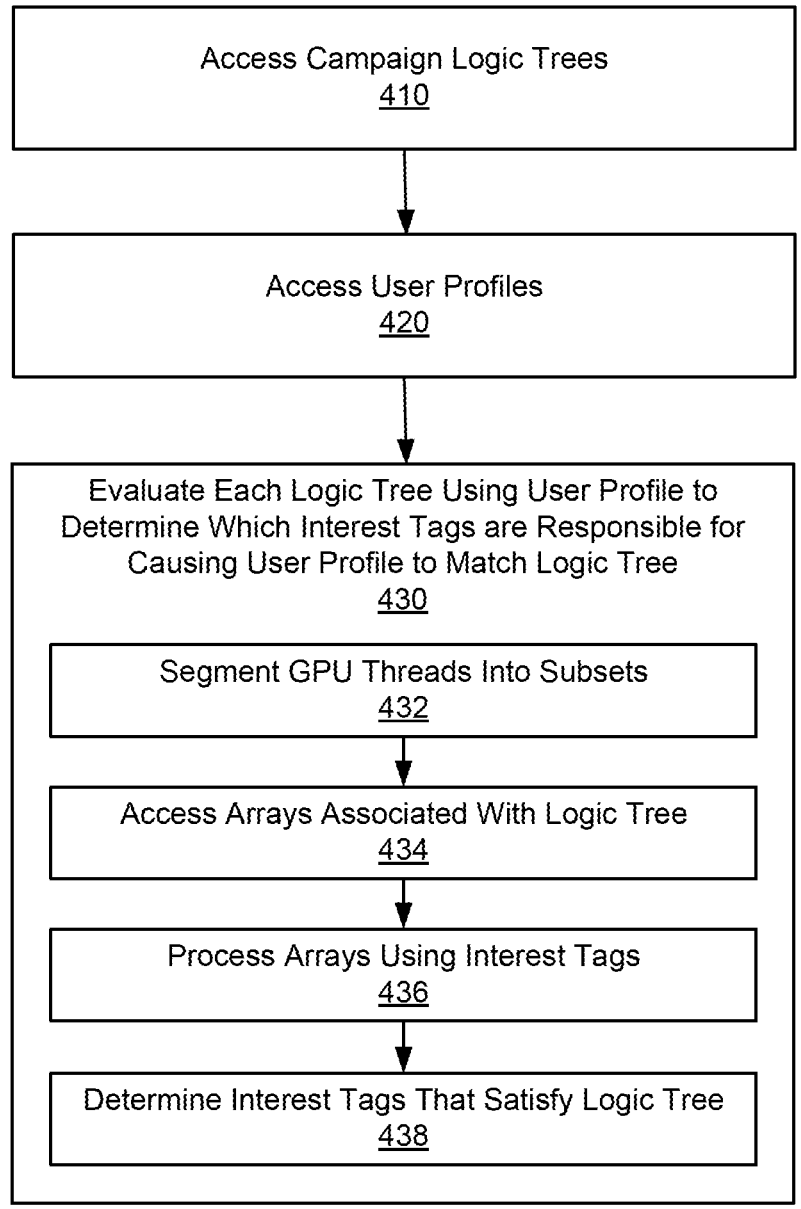
FIG. 4 is a flowchart illustrating an example of a process for determining interest tags that are responsible for causing a campaign logic tree to be satisfied, according to some aspects of the present disclosure.

FIG. 4 is a flowchart illustrating an example of a process for determining interest tags that are responsible for causing a campaign logic tree to be satisfied, according to some aspects of the present disclosure. Process 400 may be performed, for example, by any of the components described herein, for example, cloud-based application 120, cloud service 130, cloud-based server 140, and/or GPU 160. Further, process 400 may be performed to identify interest tags that are responsible (e.g., "responsible tags") for causing a campaign logic tree to be satisfied as "true," and to store the "responsible tags" in a GPU-specialized data structure and a CPU-oriented data structure.

Process 400 begins at block 410 where the GPU accesses a set of campaign logic trees. For example, the GPU can retrieve the set of campaign logic trees from a GPU-specialized data structure configured to store flattened versions of the campaign logic trees in a sequential order. At block 420, the GPU can also access a set of user profiles to evaluate against the campaign logic trees. For example, the GPU can retrieve the set of user profiles from another GPU-specialized data structure that is configured to store the interest tags of various user profiles.

At block 430, the GPU evaluates each campaign logic tree using the interest tags of a user profile to determine which interest tags are responsible for causing the user profile to match or satisfy the campaign logic tree as true. Block 430 can include blocks 432, 434, 436, and 438. At block 430, the set of threads of the GPU can be segmented into subsets of threads. For example, a subset of threads can correspond to a warp of the GPU, and thus, can include 32 threads. At block 434, the GPU can retrieve the campaign logic trees from the GPU-specialized data structure that is configured to store flattened versions of the campaign logic trees. For example, the GPU can load data from the campaign operand values array and the campaign operator array (as described above in the present disclosure) for each campaign logic tree. At block 436, the GPU can iteratively process the retrieved campaign logic trees using the interest tags of user profiles accessed at block 420. Lastly, at block 438, the GPU can determine which interest tags of a user profile cause the logic of campaign logic trees to be satisfied as "true."

Blocks 436 and 438 may represent an example of a matching protocol that is performed by the GPU to evaluate the user profiles against the campaign logic trees to determine which user profiles match the campaign logic trees. As an illustrative example, the matching protocol may include the steps described below. Each thread of the warp can retrieve an interest tag from the second array (e.g., the user interest array as describe with respect to FIG. 3). For every interest tag, the thread can identify the operand values of various campaign logic trees that reference the interest tag (e.g., using the interest map array, which maps interest tags to offset operand values identifying the position of operands relating to each campaign logic tree). The thread can mark that operand as true by setting a bit in another array to "1" for example. Additionally, the thread can mark the campaign logic tree that references that operand as a possible match by setting a bit to "1" in yet another array. For every campaign logic tree marked as a possible match, the thread can evaluate the logic of the campaign logic tree to determine if the logic has been satisfied as "true." If the logic has been satisfied, then the thread sets another bit in another array to indicate that the campaign logic tree has been satisfied.

For every campaign logic tree that has been satisfied as "true," the thread can determine, for every operand in the campaign logic tree, whether that operand was responsible for satisfying the logic as "true." For example, in a campaign logic tree with (OR cars (AND drinks food)) and a user profile that includes the interest tag of "likes cars" and another interest tag of "likes drinks, but not food," then only the "cars" branch of the campaign logic tree would be responsible for satisfying the logic as "true." Thus, the interest tag of "likes cars" would be responsible for satisfying the logic as "true." If the operand is responsible for satisfying the logic as "true," the thread can mark the operand as a "responsible tag" by setting a bit in yet another array and store the integer representing that interest (e.g., the integer representing "cars" in the example above) in an array of "responsible interests" for that campaign logic tree. Further, for example, if an operand targets "cars," and a user profile is flagged for "cars", "pickup trucks", and "sports cars", the thread can record all three operands as a "responsible interest" for that operand. Lastly, for every campaign logic tree that was evaluated to a "true" result, and for every operand value of the campaign logic tree, the thread can append the array of interests for that operand to a list of interests responsible for causing the campaign to evaluate as "true."

Figure 5:
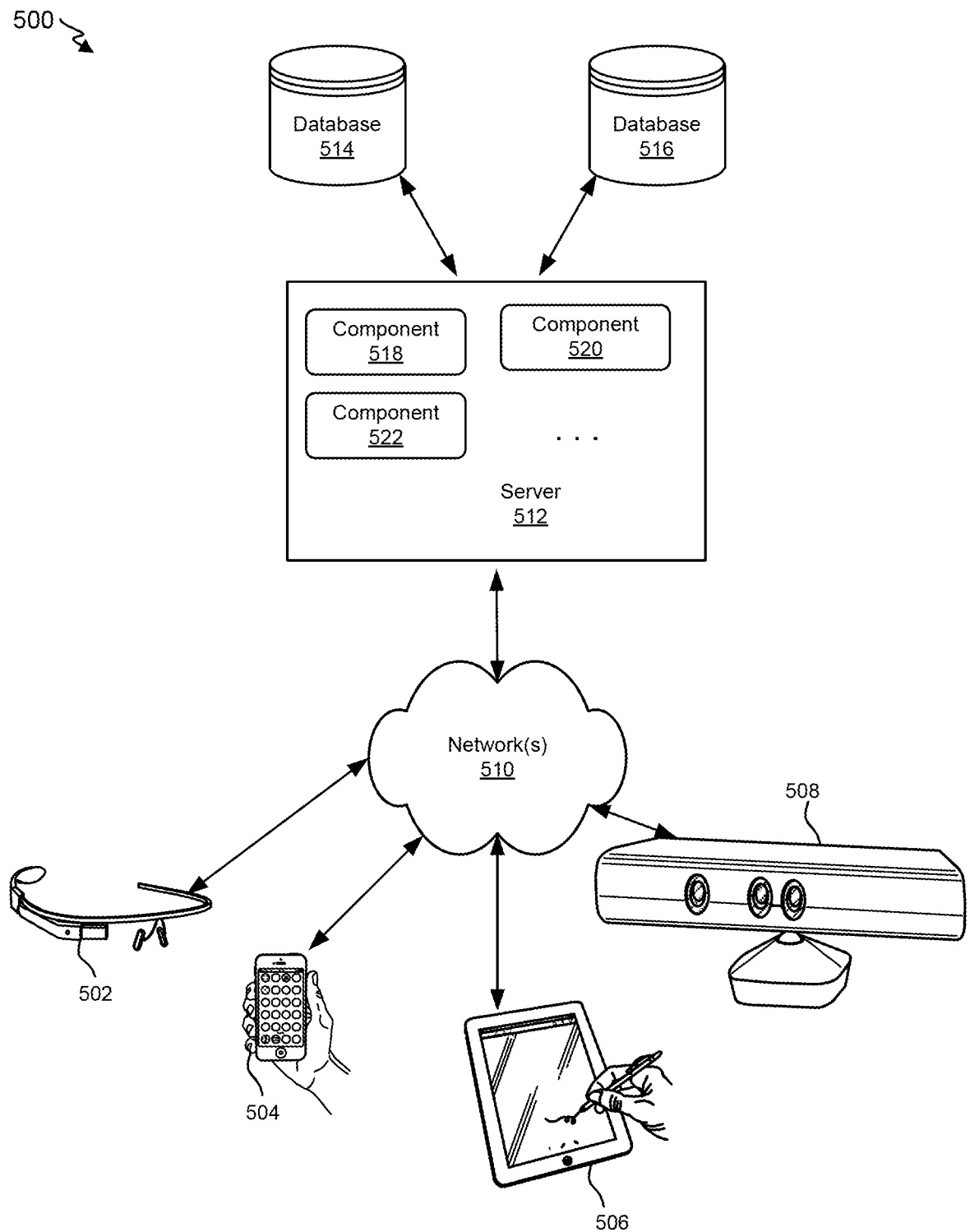
FIG. 5 is a simplified diagram illustrating a distributed system for implementing one of the embodiments.

FIG. 5 depicts a simplified diagram of a distributed system 500 for implementing one of the embodiments. In the illustrated embodiment, distributed system 500 includes one or more client computing devices 502, 504, 506, and 508, which are configured to execute and operate a client application such as a web browser, proprietary client (e.g., Oracle Forms), or the like over one or more network(s) 510. Server 512 may be communicatively coupled with remote client computing devices 502, 504, 506, and 508 via network 510.

In various embodiments, server 512 may be adapted to run one or more services or software applications provided by one or more of the components of the system. In some embodiments, these services may be offered as web-based or cloud services or under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in the figure, the software components 518, 520 and 522 of system 500 are shown as being implemented on server 512. In other embodiments, one or more of the components of system 500 and/or the services provided by these components may also be implemented by one or more of the client computing devices 502, 504, 506, and/or 508. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in the figure is thus one example of a distributed system for implementing an embodiment system and is not intended to be limiting.

Client computing devices 502, 504, 506, and/or 508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 502, 504, 506, and 508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 510.

Although exemplary distributed system 500 is shown with four client computing devices, any number of client computing devices may be supported. Other devices, such as devices with sensors, etc., may interact with server 512.

Network(s) 510 in distributed system 500 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 510 can be a local area network (LAN), such as one based on Ethernet, Token-Ring and/or the like. Network(s) 510 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 512 may be adapted to run one or more services or software applications described in the foregoing disclosure. For example, server 512 may correspond to a server for performing processing described above according to an embodiment of the present disclosure.

Server 512 may run an operating system including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more databases 514 and 516. Databases 514 and 516 may reside in a variety of locations. By way of example, one or more of databases 514 and 516 may reside on a non-transitory storage medium local to (and/or resident in) server 512. Alternatively, databases 514 and 516 may be remote from server 512 and in communication with server 512 via a network-based or dedicated connection. In one set of embodiments, databases 514 and 516 may reside in a storage-area network (SAN). Similarly, any necessary files for performing the functions attributed to server 512 may be stored locally on server 512 and/or remotely, as appropriate. In one set of embodiments, databases 514 and 516 may include relational databases, such as databases provided by Oracle, that are adapted to store, update, and retrieve data in response to SQL-formatted commands.

Figure 6:
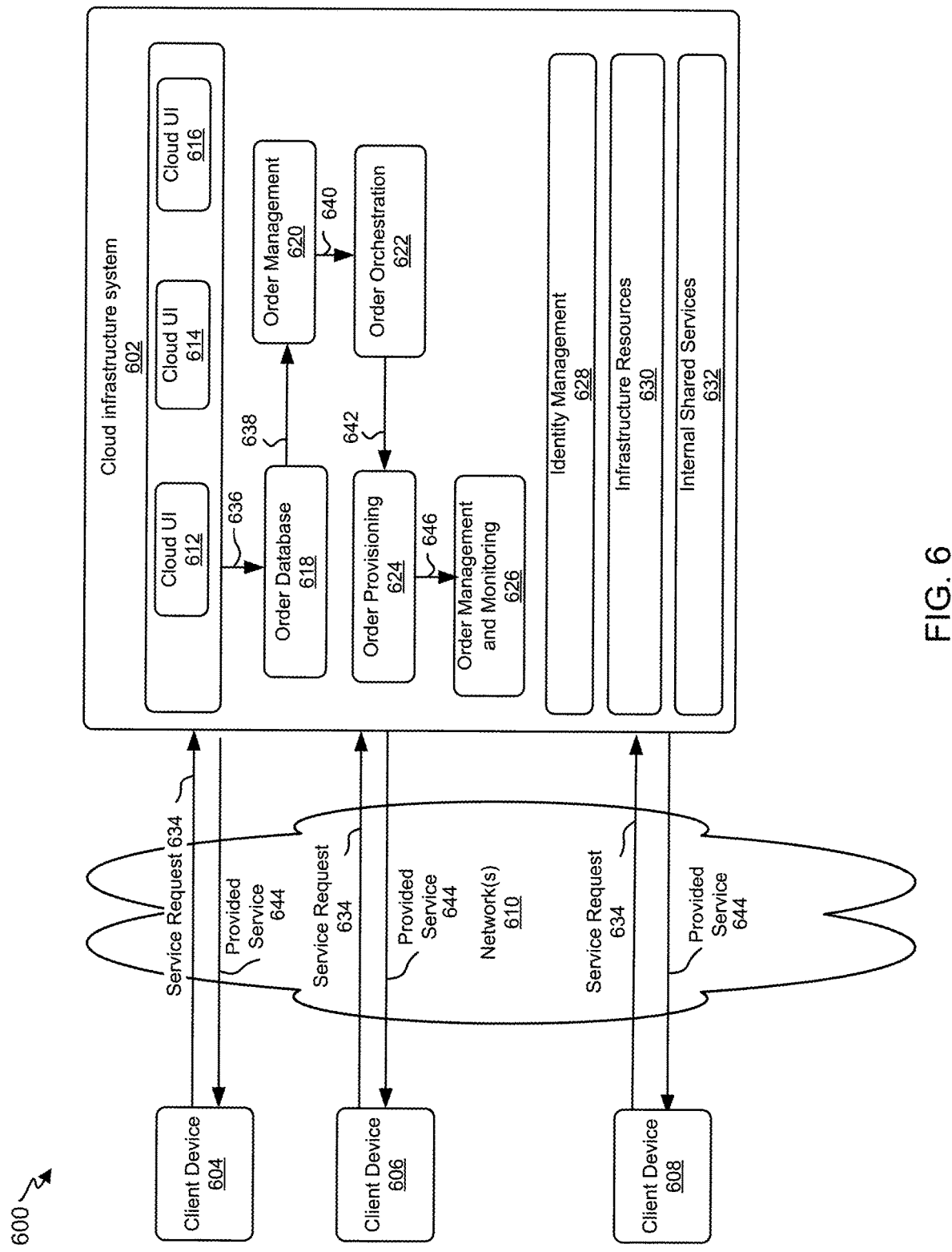
FIG. 6 is a simplified block diagram illustrating one or more components of a system environment.

FIG. 6 is a simplified block diagram of one or more components of a system environment 600 by which services provided by one or more components of an embodiment system may be offered as cloud services, in accordance with an embodiment of the present disclosure. In the illustrated embodiment, system environment 600 includes one or more client computing devices 604, 606, and 608 that may be used by users to interact with a cloud infrastructure system 602 that provides cloud services. The client computing devices may be configured to operate a client application such as a web browser, a proprietary client application (e.g., Oracle Forms), or some other application, which may be used by a user of the client computing device to interact with cloud infrastructure system 602 to use services provided by cloud infrastructure system 602.

It should be appreciated that cloud infrastructure system 602 depicted in the figure may have other components than those depicted. Further, the embodiment shown in the figure is only one example of a cloud infrastructure system that may incorporate an embodiment of the invention. In some other embodiments, cloud infrastructure system 602 may have more or fewer components than shown in the figure, may combine two or more components, or may have a different configuration or arrangement of components.

Client computing devices 604, 606, and 608 may be devices similar to those described above for 502, 504, 506, and 508.

Although exemplary system environment 600 is shown with three client computing devices, any number of client computing devices may be supported. Other devices such as devices with sensors, etc. may interact with cloud infrastructure system 602.

Network(s) 610 may facilitate communications and exchange of data between clients 604, 606, and 608 and cloud infrastructure system 602. Each network may be any type of network familiar to those skilled in the art that can support data communications using any of a variety of commercially-available protocols, including those described above for network(s) 510.

Cloud infrastructure system 602 may comprise one or more computers and/or servers that may include those described above for server 512.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application executing on an application server, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 602 may be adapted to automatically provision, manage and track a customer's subscription to services offered by cloud infrastructure system 602. Cloud infrastructure system 602 may provide the cloud services via different deployment models. For example, services may be provided under a public cloud model in which cloud infrastructure system 602 is owned by an organization selling cloud services (e.g., owned by Oracle) and the services are made available to the general public or different industry enterprises. As another example, services may be provided under a private cloud model in which cloud infrastructure system 602 is operated solely for a single organization and may provide services for one or more entities within the organization. The cloud services may also be provided under a community cloud model in which cloud infrastructure system 602 and the services provided by cloud infrastructure system 602 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 602. Cloud infrastructure system 602 then performs processing to provide the services in the customer's subscription order.

In some embodiments, the services provided by cloud infrastructure system 602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 602 may also include infrastructure resources 630 for providing the resources used to provide various services to customers of the cloud infrastructure system. In one embodiment, infrastructure resources 630 may include pre-integrated and optimized combinations of hardware, such as servers, storage, and networking resources to execute the services provided by the PaaS platform and the SaaS platform.

In some embodiments, resources in cloud infrastructure system 602 may be shared by multiple users and dynamically re-allocated per demand. Additionally, resources may be allocated to users in different time zones. For example, cloud infrastructure system 630 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 632 may be provided that are shared by different components or modules of cloud infrastructure system 602 and by the services provided by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 602, and the like.

In one embodiment, as depicted in the figure, cloud management functionality may be provided by one or more modules, such as an order management module 620, an order orchestration module 622, an order provisioning module 624, an order management and monitoring module 626, and an identity management module 628. These modules may include or be provided using one or more computers and/or servers, which may be general purpose computers, specialized server computers, server farms, server clusters, or any other appropriate arrangement and/or combination.

In exemplary operation 634, a customer using a client device, such as client device 604, 606 or 608, may interact with cloud infrastructure system 602 by requesting one or more services provided by cloud infrastructure system 602 and placing an order for a subscription for one or more services offered by cloud infrastructure system 602. In certain embodiments, the customer may access a cloud User Interface (UI), cloud UI 612, cloud UI 614 and/or cloud UI 616 and place a subscription order via these UIs. The order information received by cloud infrastructure system 602 in response to the customer placing an order may include information identifying the customer and one or more services offered by the cloud infrastructure system 602 that the customer intends to subscribe to.

After an order has been placed by the customer, the order information is received via the cloud UIs, 612, 614 and/or 616.

At operation 636, the order is stored in order database 618. Order database 618 can be one of several databases operated by cloud infrastructure system 618 and operated in conjunction with other system elements.

At operation 638, the order information is forwarded to an order management module 620. In some instances, order management module 620 may be configured to perform billing and accounting functions related to the order, such as verifying the order, and upon verification, booking the order.

At operation 640, information regarding the order is communicated to an order orchestration module 622. Order orchestration module 622 may utilize the order information to orchestrate the provisioning of services and resources for the order placed by the customer. In some instances, order orchestration module 622 may orchestrate the provisioning of resources to support the subscribed services using the services of order provisioning module 624.

In certain embodiments, order orchestration module 622 enables the management of processes associated with each order and applies logic to determine whether an order should proceed to provisioning. At operation 642, upon receiving an order for a new subscription, order orchestration module 622 sends a request to order provisioning module 624 to allocate resources and configure those resources needed to fulfill the subscription order. Order provisioning module 624 enables the allocation of resources for the services ordered by the customer. Order provisioning module 624 provides a level of abstraction between the cloud services provided by cloud infrastructure system 600 and the physical implementation layer that is used to provision the resources for providing the requested services. Order orchestration module 622 may thus be isolated from implementation details, such as whether or not services and resources are actually provisioned on the fly or pre-provisioned and only allocated/assigned upon request.

At operation 644, once the services and resources are provisioned, a notification of the provided service may be sent to customers on client devices 604, 606 and/or 608 by order provisioning module 624 of cloud infrastructure system 602.

At operation 646, the customer's subscription order may be managed and tracked by an order management and monitoring module 626. In some instances, order management and monitoring module 626 may be configured to collect usage statistics for the services in the subscription order, such as the amount of storage used, the amount data transferred, the number of users, and the amount of system up time and system down time.

In certain embodiments, cloud infrastructure system 600 may include an identity management module 628. Identity management module 628 may be configured to provide identity services, such as access management and authorization services in cloud infrastructure system 600. In some embodiments, identity management module 628 may control information about customers who wish to utilize the services provided by cloud infrastructure system 602. Such information can include information that authenticates the identities of such customers and information that describes which actions those customers are authorized to perform relative to various system resources (e.g., files, directories, applications, communication ports, memory segments, etc.) Identity management module 628 may also include the management of descriptive information about each customer and about how and by whom that descriptive information can be accessed and modified.

Figure 7:
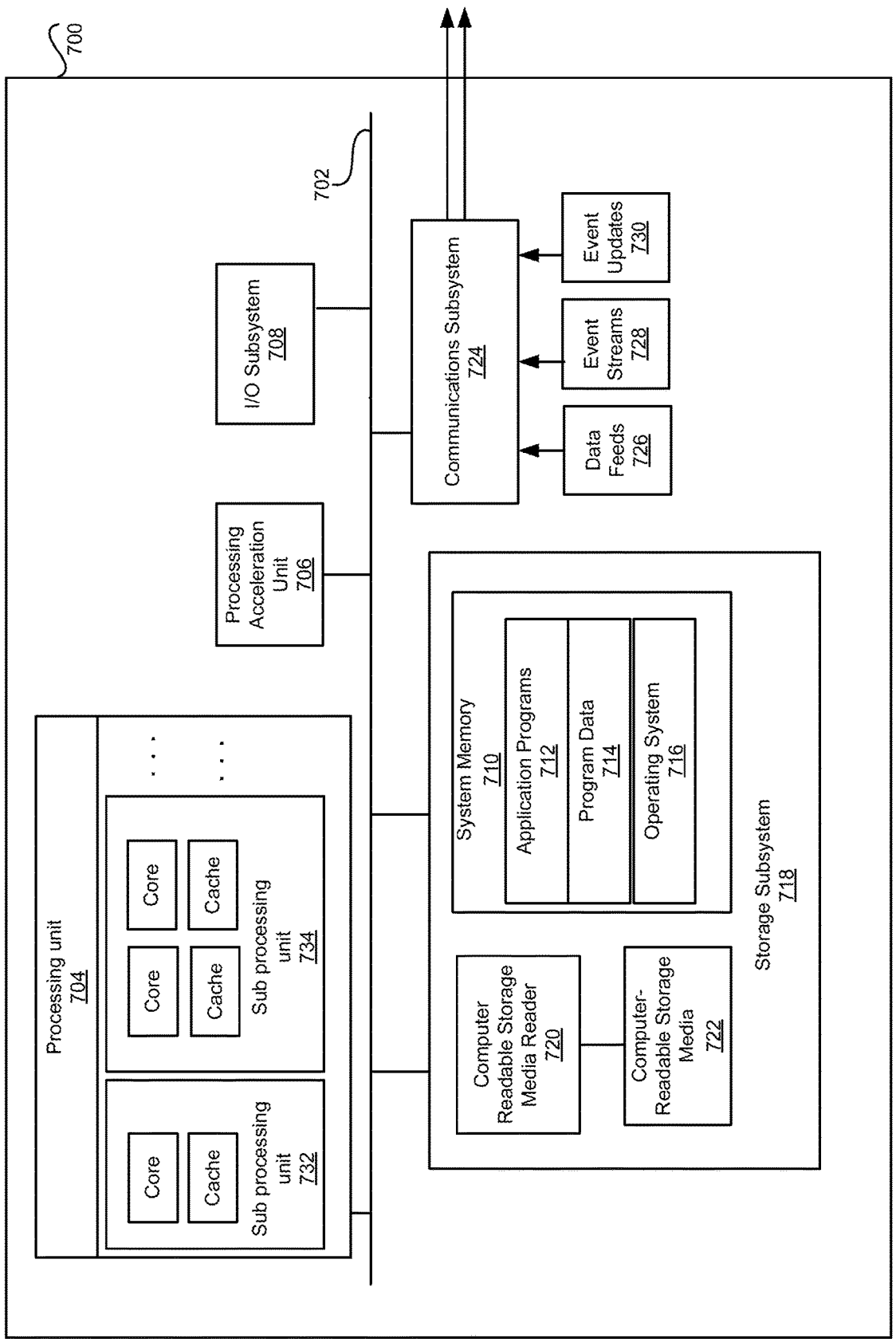
FIG. 7 illustrates an exemplary computer system, in which various embodiments of the present invention may be implemented.

FIG. 7 illustrates an exemplary computer system 700, in which various embodiments of the present invention may be implemented. The system 700 may be used to implement any of the computer systems described above. As shown in the figure, computer system 700 includes a processing unit 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 includes tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 704, which can be implemented as one or more integrated circuits (e.g., a conventional microprocessor or microcontroller), controls the operation of computer system 700. One or more processors may be included in processing unit 704. These processors may include single core or multicore processors. In certain embodiments, processing unit 704 may be implemented as one or more independent processing units 732 and/or 734 with single or multicore processors included in each processing unit. In other embodiments, processing unit 704 may also be implemented as a quad-core processing unit formed by integrating two dual-core processors into a single chip.

In various embodiments, processing unit 704 can execute a variety of programs in response to program code and can maintain multiple concurrently executing programs or processes. At any given time, some or all of the program code to be executed can be resident in processor(s) 704 and/or in storage subsystem 718. Through suitable programming, processor(s) 704 can provide various functionalities described above. Computer system 700 may additionally include a processing acceleration unit 706, which can include a digital signal processor (DSP), a special-purpose processor, and/or the like.

I/O subsystem 708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 700 may comprise a storage subsystem 718 that comprises software elements, shown as being currently located within a system memory 710. System memory 710 may store program instructions that are loadable and executable on processing unit 704, as well as data generated during the execution of these programs.

Depending on the configuration and type of computer system 700, system memory 710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 704. In some implementations, system memory 710 may include multiple different types of memory, such as static random access memory (SRAM) or dynamic random access memory (DRAM). In some implementations, a basic input/output system (BIOS), containing the basic routines that help to transfer information between elements within computer system 700, such as during start-up, may typically be stored in the ROM. By way of example, and not limitation, system memory 710 also illustrates application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 718 may also provide a tangible computer-readable storage medium for storing the basic programming and data constructs that provide the functionality of some embodiments. Software (programs, code modules, instructions) that when executed by a processor provide the functionality described above may be stored in storage subsystem 718. These software modules or instructions may be executed by processing unit 704. Storage subsystem 718 may also provide a repository for storing data used in accordance with the present invention.

Storage subsystem 700 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for temporarily and/or more permanently containing, storing, transmitting, and retrieving computer-readable information.

Computer-readable storage media 722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 700.

By way of example, computer-readable storage media 722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 700.

Communications subsystem 724 provides an interface to other computer systems and networks. Communications subsystem 724 serves as an interface for receiving data from and transmitting data to other systems from computer system 700. For example, communications subsystem 924 may enable computer system 700 to connect to one or more devices via the Internet. In some embodiments communications subsystem 724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

In some embodiments, communications subsystem 724 may also receive input communication in the form of structured and/or unstructured data feeds 726, event streams 728, event updates 730, and the like on behalf of one or more users who may use computer system 700.

By way of example, communications subsystem 724 may be configured to receive data feeds 726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 724 may also be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

The invention claimed is:

1. A computer-implemented method, comprising:
accessing a set of user profiles stored in a user profile database, each user profile of the set of user profiles including a one or more interest tags, each interest tag of the one or more interest tags characterizing an interest of a user detected based on an interaction between a user device and a web server or an application server;
determining that one or more characteristics of each user profile of the set of user profiles satisfies an offloading condition, wherein the offloading condition is a condition for transferring processing the set of the user profiles from a cloud service to a graphical processing unit (GPU);
pre-processing, in response to determining that the offloading condition is satisfied and with the graphical processing unit (GPU), the set of user profiles by:
segmenting the set of user profiles into a plurality of subsets of user profiles, wherein a number of user profiles in each subset of user profiles of the subsets of user profiles equals a number of threads in a warp of the GPU; and
for each subset of user profiles of the plurality of subsets of user profiles, creating at least one array, the at least one array storing interest tags for the respective subset of user profiles; and
for each subset of user profiles of the plurality of subsets of user profiles, storing the at least one array in a specialized data structure;
determining, using warps of the GPU, one or more user profiles of the set of user profiles that satisfy logic of one or more campaign logic trees of a marketing campaign, wherein the one or more user profiles are determined based on the one or more interest tags of the specialized data structures and one or more operand values of the one or more campaign logic trees; and
returning, in response to a query for user profiles, the one or more user profiles to the marketing campaign.

2. The method of claim 1, wherein the at least one array stores interest tags for the respective subset of user profiles in a sorted order, wherein interest tags for a user profile are arranged sequentially in the at least one array according to interest identifiers.

3. The method of claim 1, wherein the at least one array stores interest tags for the respective subset of user profiles in an interleaved manner, wherein interest tags for a user profile are interleaved with interest tags for another user profile in the at least one array according to interest identifiers.

4. The method of claim 1, wherein the GPU is configured with a set of threads, each thread of the set of threads executing of instructions running on a core of the GPU, wherein a warp of the warps of the GPU corresponds to a subset of threads of the set of threads.

5. The method of claim 1, wherein determining, using warps of the GPU, one or more user profiles of the set of user profiles that satisfy logic of one or more campaign logic trees of a marketing campaign comprises reading a specialized data structure of the specialized data structures with a warp of the GPU.

6. The method of claim 1, wherein determining, using warps of the GPU, one or more user profiles of the set of user profiles that satisfy logic of one or more campaign logic trees of a marketing campaign comprises:
retrieving interest tags from an array of a specialized data structure of the specialized data structures;
identifying one or more operand values of a campaign logic tree of the one or more campaign logic trees that references the retrieved interest tags; and
setting the campaign logic tree of the one or more campaign logic trees as true.

7. A system, comprising:
one or more processors; and
a non-transitory computer-readable storage medium containing instructions which, when executed on the one or more processors, cause the one or more processors to perform operations including:
accessing a set of user profiles stored in a user profile database, each user profile of the set of user profiles including one or more interest tags, each interest tag of the one or more interest tags characterizing an interest of a user detected based on an interaction between a user device and a web server or an application server;
determining that one or more characteristics of each user profile of the set of user profiles satisfies an offloading condition, wherein the offloading condition is a condition for transferring processing the set of the user profiles from a cloud service to a GPU;
pre-processing, in response to determining that the offloading condition is satisfied and with the GPU, the set of user profiles by:
segmenting the set of user profiles into a plurality of subsets of user profiles, wherein a number of user profiles in each subset of user profiles of the subsets of user profiles equals a number of threads in a warp of the GPU; and
for each subset of user profiles of the plurality of subsets of user profiles, creating at least one array, the at least one array storing interest tags for the respective subset of user profiles; and
for each subset of user profiles of the plurality of subsets of user profiles, storing the at least one array in a specialized data structure;
determining, using warps of the GPU, one or more user profiles of the set of user profiles that satisfy logic of one or more campaign logic trees of a marketing campaign, wherein the one or more user profiles are determined based on the one or more interest tags of the specialized data structures and one or more operand values of the one or more campaign logic trees; and
returning, in response to a query for user profiles, the one or more user profiles to the marketing campaign.

8. The system of claim 7, wherein the at least one array stores interest tags for the respective subset of user profiles in a sorted order, wherein interest tags for a user profile are arranged sequentially in the at least one array according to interest identifiers.

9. The system of claim 7, wherein the at least one array stores interest tags for the respective subset of user profiles in an interleaved manner, wherein interest tags for a user profile are interleaved with interest tags for another user profile in the at least one array according to interest identifiers.

10. The system of claim 7, wherein the GPU is configured with a set of threads, each thread of the set of threads executing of instructions running on a core of the GPU, wherein a warp of the warps of the GPU corresponds to a subset of threads of the set of threads.

11. The system of claim 7, wherein determining, using warps of the GPU, one or more user profiles of the set of user profiles that satisfy logic of one or more campaign logic trees of a marketing campaign comprises reading a specialized data structure of the specialized data structures with a warp of the GPU.

12. The system of claim 7, wherein determining, using warps of the GPU, one or more user profiles of the set of user profiles that satisfy logic of one or more campaign logic trees of a marketing campaign comprises:
- retrieving interest tags from an array of a specialized data structure of the specialized data structures;
- identifying one or more operand values of a campaign logic tree of the one or more campaign logic trees that references the retrieved interest tags; and
- setting the campaign logic tree of the one or more campaign logic trees as true.

13. A non-transitory computer-readable medium storing computer-readable instructions that, when executed by one or more processors, cause the one or more processors to perform operations including:
- accessing a set of user profiles stored in a user profile database, each user profile of the set of user profiles including one or more interest tags, each interest tag of the one or more interest tags characterizing an interest of a user detected based on an interaction between a user device and a web server or an application server;
- determining that one or more characteristics of each user profile of the set of user profiles satisfies an offloading condition, wherein the offloading condition is a condition for transferring processing of the set of the user profiles from a cloud service to a GPU;
- pre-processing, in response to determining that the offloading condition is satisfied and with the GPU, the set of user profiles by:
  - segmenting the set of user profiles into a plurality of subsets of user profiles, wherein a number of user profiles in each subset of user profiles of the subsets of user profiles equals a number of threads in a warp of the GPU; and
  - for each subset of user profiles of the plurality of subsets of user profiles, creating at least one array, the at least one array storing interest tags for the respective subset of user profiles; and
  - for each subset of user profiles of the plurality of subsets of user profiles, storing the at least one array in a specialized data structure;
- determining, using warps of the GPU, one or more user profiles of the set of user profiles that satisfy logic of one or more campaign logic trees of a marketing campaign, wherein the one or more user profiles are determined based on the one or more interest tags of the specialized data structures and one or more operand values of the one or more campaign logic trees; and
- returning, in response to a query for user profiles, the one or more user profiles to the marketing campaign.

14. The computer-readable medium of claim 13, wherein the at least one array stores interest tags for the respective subset of user profiles in a sorted order, wherein interest tags for a user profile are arranged sequentially in the first array according to interest identifiers.

15. The computer-readable medium of claim 13, wherein the at least one array stores interest tags for the respective subset of user profiles in an interleaved manner, wherein interest tags for a user profile are interleaved with interest tags for another user profile in the first second according to interest identifiers.

16. The computer-readable medium of claim 13, wherein the GPU is configured with a set of threads, each thread of the set of threads executing of instructions running on a core of the GPU, wherein a warp of the warps of the GPU corresponds to a subset of threads of the set of threads.

17. The computer-readable medium of claim 13, wherein determining, using warps of the GPU, one or more user profiles of the set of user profiles that satisfy logic of one or more campaign logic trees of a marketing campaign comprises reading a specialized data structure of the specialized data structures with a warp of the GPU.

18. The computer-readable medium of claim 13, wherein determining, using warps of the GPU, one or more user profiles of the set of user profiles that satisfy logic of one or more campaign logic trees of a marketing campaign comprises:
- retrieving interest tags from an array of a specialized data structure of the specialized data structures;
- identifying one or more operand values of a campaign logic tree of the one or more campaign logic trees that references the retrieved interest tags; and
- setting the campaign logic tree of the one or more campaign logic trees as true.

* * * * *